United States Patent [19]
Naito et al.

[11] Patent Number: 5,964,509
[45] Date of Patent: Oct. 12, 1999

[54] ANTI-LOCK BRAKE CONTROL SYSTEM FOR MOTOR VEHICLE AND BRAKE FORCE CONTROL METHOD THEREOF

[75] Inventors: Yasuo Naito; Chiaki Fujimoto; Mitsuhiro Mimura, all of Tokyo, Japan

[73] Assignee: Mitsubishi Denki Kabushiki Kaisha, Tokyo, Japan

[21] Appl. No.: 08/863,366

[22] Filed: May 27, 1997

[30] Foreign Application Priority Data

May 27, 1996 [JP] Japan ..................................... 8-132199

[51] Int. Cl.⁶ ................................. B60T 8/00; B60T 8/52
[52] U.S. Cl. .................................... 303/112; 364/426.015
[58] Field of Search ........................... 303/112, 166–174, 303/177, 183, 184, 185, 186–190; 364/426.015, 426.024

[56] References Cited

U.S. PATENT DOCUMENTS

| | | | |
|---|---|---|---|
| 5,170,343 | 12/1992 | Matsuda | 364/184 |
| 5,418,724 | 5/1995 | Iiboshi | 364/426.02 |
| 5,657,229 | 8/1997 | Naito et al. | 364/426.015 |
| 5,797,664 | 8/1998 | Tagawa | 303/190 |

FOREIGN PATENT DOCUMENTS 08150913  6/1996  Japan .

*Primary Examiner*—Chris Schwartz
*Attorney, Agent, or Firm*—Sughrue, Mion, Zinn, Macpeak & Seas, PLLC

[57] ABSTRACT

An anti-lock brake control system for a motor in which influence of vibration of wheel driving shafts occurring upon braking in the state where the wheels ($1a$, $1b$) are operatively connected to a prime mover such as an internal combustion engine is suppressed to thereby enhance the braking performance of the system. Rotation speed (Vw) of each of the driving wheels ($1a$ to $1d$) of the motor vehicle is detected for determining wheel acceleration (Gw). A torsion torque (Tt) applied to a wheel drive shaft is detected. The wheel acceleration (Gw) is corrected with the torsion torque (Tt) for determining a corrected acceleration (Gc). The brake application pressure is controlled in dependence on combinations of two variables, i.e., the corrected acceleration (Gc) and the wheel acceleration (Gw). Owing to detection of the torsion torque (Tt), not only the influence of the vibration of the wheel ($1a$ to $1d$) due to the torsion torque (Tt) but also a delay involved in the detection of the torsion torque (Tt) can be taken into consideration in the anti-lock brake control.

15 Claims, 9 Drawing Sheets

ANTI-LOCK BRAKE CONTROL SYSTEM FOR MOTOR VEHICLE AND BRAKE FORCE CONTROL METHOD THEREOF

BACKGROUND OF THE INVENTION

1. Field of the Invention

The present invention relates generally to an anti-lock brake control system for a motor vehicle in which driving wheels are driven by a prime mover such as an internal combustion engine by way of a torque transmitting member such as an axle shaft, a drive shaft or the like to which a torsion torque is applied. In more particular, the invention is concerned with the anti-lock brake control system which is capable of controlling brake forces applied to the wheels in such manner that the vehicle can stop with a short stopping distance upon braking, while ensuring a high stability for the operation of the brake system as well as high controllability of the motor vehicle. The invention is further concerned with a brake force control method which can be carried out by a microcomputer or the like.

2. Description of Related Art

In general, in the anti-lock brake control system for the motor vehicle, the trend of wheels being locked is detected on the basis of the result of comparison between the wheel speed (given, for example, by a rotation number of the wheel per minute or rpm) and an estimated speed of the motor vehicle or on the basis of deceleration of the wheel or the like. In that case, braking hydraulic pressure applied to the wheel is so regulated that magnitude of skid of the wheel relative to the road surface is maintained at a value close to a region in which friction between the wheel and the road surface assumes a peak value, with a view to shortening the stopping distance of the motor vehicle, while ensuring stability of the vehicle body and enhancing the manipulatability or driving performance of the motor vehicle. By way of example, in the conventional anti-lock brake control system known heretofore, decision is made to the effect that the wheel of the motor vehicle tends to be locked when behavior of the wheel such as a slip thereof which represents a sink of the wheel speed relative to the estimated vehicle speed attains a predetermined threshold value, whereupon the braking hydraulic pressure applied to the wheel is lowered under control.

As is apparent from the above, in the conventional anti-lock brake control system, the braking hydraulic pressure is controlled on the basis of the wheel speed and the wheel acceleration. Accordingly, when the brake force is applied steeply, the driving wheels coupled to an internal combustion engine (hereinafter also referred to simply as the engine) by way of the wheel drive shaft(s), i.e., the driving wheels are decelerated at a high rate. On the other hand, the engine which exhibits a large inertia is caused to decelerate only slowly when compared with the driving wheels. As a consequence, torsion of a great magnitude takes place in the drive shaft coupling the driving wheels and the engine. Under the influence of this torsion, the wheels are caused to decelerate and accelerate respectively. In other words, vibration occurs in the driving wheels.

Consequently, the braking hydraulic pressure is lowered in an effort to suppress the vibration of the driving wheels as brought about by the torsion taking place in the drive shaft regardless of the condition of the road on which the motor vehicle is running, as a result the stopping distance becomes longer. Furthermore, in the case where the motor vehicle is running on a road having a surface of small coefficient of friction (hereinafter also referred to as the frictional coefficient), the vibration of the driving wheel due to the torsion of the drive shaft may erroneously be decided that the vibration is ascribable to a rough road condition. In that case, a higher braking pressure exceeding the reaction force exerted by the road surface may be unwontedly sustained, whereby the trend of the wheels being locked is promoted, incurring instability in the running performance of the motor vehicle as well as degradation in the controllability (i.e., stable manipulatability) thereof. For these reasons, with the anti-lock brake control system known heretofore, there may rise such situation that optimal brake force which conforms with the running states of the motor vehicle and the road condition can not always be ensured.

As the measures for coping with the problems of the conventional anti-lock brake control system, the inventors of the present application have already proposed an improved anti-lock brake control system in which a torsion torque occurring between the engine and the driving wheel(s) operatively connected to the engine via a drive shaft is detected, whereon the wheel acceleration is corrected in consideration of the detected torsion torque to thereby determine a corrected acceleration to be employed as a control parameter for the anti-lock brake control as is disclosed in Japanese Unexamined Patent Application Publication No. 296693/1994 (JP-A-6-296693). The corrected acceleration can be arithmetically determined as follows:

When a torsion is applied to the drive shaft for the wheels, the equation of motion of the wheel in which the torsion is taken into consideration can be expressed as follows:

$$Iw \cdot (d\omega/dt) = \mu \cdot W \cdot r - Tb - Tt \qquad (1)$$

where

Iw represents the moment of inertia of the wheel, $\omega$ represents an angular velocity of the wheel, Tt represents a torsion torque, $\mu$ represents a coefficient of friction of a road surface, W represents a load imposed on the wheel, r represents a radius of the wheel, and Tb represents a brake torque.

Relation between the wheel angular velocity $\omega$ and the wheel acceleration Gw can be expressed as follows:

$$Gw = Kr \cdot (d\omega/dt) \qquad (2)$$

where Kr represents a constant. From the expressions (1) and (2), the following expression (3) can be derived.

$$Gc = Gw + (Kr/Iw) \cdot Tt \qquad (3)$$

Thus, corrected acceleration Gc can be determined on the basis of the wheel acceleration Gw and the torsion torque Tt in accordance with the above expression (3).

Furthermore, from the expressions (1) and (3), the corrected acceleration Gc can also be expressed as follows:

$$Gc = (Kr/Iw) \cdot (\mu \cdot W \cdot r - Tb) \qquad (4)$$

To say in another way, a relation between the tire torque $\mu \cdot W \cdot r$ determined by the frictional coefficient $\mu$ of the road surface, the reaction force $\mu \cdot W$ exerted by the road surface in response to the wheel load W and the wheel radius r on one hand and the brake torque Tb generated by the braking hydraulic pressure can be determined on the basis of the corrected acceleration Gc.

More specifically, it can be detected on the basis of the corrected acceleration Gc whether or not the tire torque exceeds the brake torque or how much difference exists between the tire torque and the brake torque. In other words, the relation between the reaction force of the road surface and the brake force can be determined on the basis of the corrected acceleration Gc. When it is indicated by the corrected acceleration Gc that the brake force becomes smaller than the reaction force of the road surface, lowering of the brake force is inhibited, whereas when the wheel acceleration is sufficiently high, the brake force is increased.

In this manner, by using for the anti-lock brake control the corrected acceleration derived by correcting the wheel acceleration in consideration of the torsion torque, brake force optimal for the reaction force exerted by the road surface can be applied because of possibility of regulating the braking hydraulic pressure in dependence on the behaviors which the wheel exhibits under the influence of the torsion torque.

Parenthetically, the torsion torque can be arithmetically determined on the basis of the detected rotation speed (rpm) of the engine or the drive shaft without difficulty, as readily appreciated by those skill in the art.

In the above-mentioned anti-lock brake control system proposed in precedence, the anti-lock brake control is affected by the conditions for the timing to start decreasing or increasing of the braking hydraulic pressure or for the timing to stop decreasing or increasing of the braking hydraulic pressure. More specifically, the anti-lock brake control is effectuated by making a decision on the basis of the corrected acceleration whether the brake force exceeds the reaction force of the road surface or alternatively the brake force becomes smaller than the reaction force of the road surface. Consequently, the corrected acceleration and hence the torsion torque can be utilized only for determining the timing to stop decreasing the braking hydraulic pressure or alternatively the timing to start increasing the braking hydraulic pressure. For the other controls involved in the anti-lock brake control, the torsion torque can not be employed positively.

In an attempt to detect the torsion torque by using an inexpensive means, the rotation speed (rpm) of the prime mover such as the engine is detected, whereon the torsion torque is arithmetically determined on the basis of the rate of change of the rotation speed. In practical applications, the rotation speed of the engine is determined on the basis of the pulses derived from a crank angle sensor installed ordinarily for detecting the crank angle of the engine. In this conjunction, it is noted that the number of the rotation angle pulses outputted from the crank angle sensor which depends on the rotation speed (rpm) of the engine is remarkably smaller than the number of rotation angle pulses outputted from a wheel speed sensor which serves as a wheel speed detecting means. Consequently, when compared with the information concerning the wheel speed, a lot of time is taken for making available the engine rotation number and hence the torque information. As a result of this, there may arise such situation that a delay is involved in making decision concerning the stoppage of reduction of the braking hydraulic pressure on the basis of the corrected acceleration, which may naturally lead to a delay in the timing to stop decreasing of the braking hydraulic pressure, as a result of which the brake application pressure lowers excessively. In that case, the brake force will become inadequate when the motor vehicle is running on a road having a road surface of high frictional coefficient.

SUMMARY OF THE INVENTION

In the light of the state of the art described above, it is a general object of the present invention to provide an anti-lock brake control system for a motor vehicle in which the problems of the conventional anti-lock brake control system are solved satisfactorily.

In particular, it is an object of the present invention to provide an anti-lock brake control system which is not only capable of performing the control of the timings for decreasing and increasing the braking hydraulic pressure solely through comparison of the brake force based on the corrected acceleration which is derived by correcting the wheel acceleration with torsion torque with the reaction force of the road surface but also capable of performing a series of braking hydraulic pressure controls such as decreasing, increasing and holding on the basis of both the wheel acceleration and the corrected acceleration while compensating for the delay involved in the detection of the engine rotation speed by taking into account both the wheel acceleration and the corrected acceleration, to thereby ensure the aimed controls at optimal timings.

It is another object of the present invention to provide a method of controlling the brake application pressure in dependence on combinations of values of the wheel acceleration and the corrected acceleration.

In view of the above and other objects which will become apparent as the description proceeds, there is provided according to an aspect of the present invention an anti-lock brake control system for a motor vehicle for applying brake to the motor vehicle in safety while avoiding occurrence of a wheel-locked state by repeating operation for lowering a braking hydraulic pressure when a wheel speed decreases upon braking to a level at which the wheel-locked state is likely to occur and increasing again the braking hydraulic pressure when the wheel speed is recovered as a result of the lowering of the braking hydraulic pressure, which system includes a wheel speed detecting means for detecting a rotation speed of each of the wheels of the motor vehicle, a wheel acceleration arithmetic means for arithmetically determining acceleration of the wheel on the basis of the wheel speed obtained by the wheel speed detecting means, a torsion torque detecting means for detecting a torsion torque applied to a drive shaft for operatively connecting each of the wheels to driving means, a acceleration arithmetic correction means for arithmetically determining a corrected acceleration by correcting the wheel acceleration obtained from the wheel acceleration arithmetic means with the torsion torque obtained by the torsion torque detecting means, a control command means for issuing commands for controlling brake force to be applied to the wheel in dependence on combination statuses of the wheel acceleration and the corrected acceleration, respectively, and a braking hydraulic pressure regulating means for controlling the braking hydraulic pressure in accordance with the command.

With the arrangement of the anti-lock brake control system described above in which the torsion torque applied to the driving shaft is detected and the acceleration of the wheel is corrected with the torsion torque so that the corrected acceleration can be used for controlling the brake application pressure, it is possible to perform the optimal brake force control even when vibration or torsion occurs in the driving shaft upon coupling of the driving means such as the engine to the driving wheels by means of a clutch. Besides, by arithmetically determining the torsion torque by resorting to a means for detecting the rotation speed (rpm) of the driving means or driving shaft, the anti-lock brake control system can be implemented at low cost as compared with the conventional torsion torque measuring device such as distortion gauges or the like mounted on the driving shaft.

Additionally, because the brake application pressure is controlled as a function of two variables, i.e., the wheel acceleration and the corrected wheel acceleration, delay in detecting the torsion torque can be compensated for, whereby the brake force can be regulated or adjusted optimally.

In a preferred mode for carrying out the invention, the control command means may be so designed as to issue to the braking hydraulic pressure regulating means a command for decreasing the brake application pressure when the wheel acceleration is smaller than a first predetermined value and when the corrected acceleration is smaller than a second predetermined value.

By virtue of arrangement of the anti-lock brake control system described above in which the brake force is reduced when the corrected acceleration is smaller than the second predetermined value, it is possible to realize the regulation or adjustment of the brake force by taking into account the influence of the torsion torque. Besides, when the wheel acceleration exceeds the first predetermined value, it is possible to prevent the brake force from becoming insufficient due to the delay in the timing for starting the reduction of the braking hydraulic pressure.

In another preferred mode for carrying out the invention, the control command means may be so designed as to issue to the braking hydraulic pressure regulating means a command for increasing the brake application pressure unless the wheel acceleration is smaller than the first predetermined value and unless the corrected acceleration is smaller than the second predetermined value.

Owing to the arrangement of the anti-lock brake control system described above in which the brake force is increased when the corrected acceleration exceeds the second predetermined value, it is possible to increase the brake force even when the acceleration of the wheel is suppressed under the effect of the torsion torque acting as a brake force. On the other hand, when the torsion torque acts as a driving force to accelerate the wheel rotation, it is possible to inhibit the brake force from increasing. Thus, by stopping increasing of brake force when the wheel acceleration lowers below the first predetermined value, it is possible to make available the optimal brake force while mitigating the influence of the delay involved in the determination of the torsion torque.

In yet another preferred mode for carrying out the invention, the control command means may be so designed as to issue to the braking hydraulic pressure regulating means a command for holding the brake application pressure when the wheel acceleration is smaller than the first predetermined value and unless the corrected acceleration is smaller than the second predetermined value.

With the arrangement of the anti-lock brake control system described above, such situation can be coped with in which the wheel acceleration is smaller than the first predetermined value with the corrected acceleration exceeding the second predetermined value. More specifically, the corrected acceleration is sufficiently high although the rotation speed of the wheel is significantly lowered due to the torsion torque acting as a brake force. In that case, there arises no necessity of reducing the brake force because the deceleration of the wheel is ascribable to the torsion torque and because the torsion torque will soon be attenuated. Thus, the currently effective brake force is held without reducing the brake force excessively. In this manner, the braking efficiency can be enhanced while evading the so-called wheel-lock phenomenon.

In a further preferred mode for carrying out the invention, the control command means may be so designed as to issue to the braking hydraulic pressure regulating means a command for holding the brake application pressure unless the wheel acceleration is smaller than the first predetermined value and unless the corrected acceleration is greater than a third predetermined value.

With the arrangement of the anti-lock brake control system described above, such situation can be dealt with in which the wheel acceleration decreases only a bit or the wheel is being accelerated, while the corrected acceleration lowers significantly. In that case, the torsion torque acts as a driving force, whereby the tendency of the wheel rotation being decelerated is suppressed. Accordingly, the brake force has to be lowered when the torsion torque acting as the driving force becomes small with the wheel rotation being decelerated. However, so long as the torsion torque is large, the currently effective brake force is sustained or held in preparation for the succeeding reduction of the brake force. In this manner, the optimal brake force can be continuously maintained.

In a yet further preferred mode for carrying out the invention, the control command means may be so designed as to issue to the braking hydraulic pressure regulating means a command for increasing stepwise the brake application pressure when the wheel acceleration falls within a first predetermined range and when the corrected acceleration falls within a second predetermined range and when the wheel acceleration is lowering.

In the case of the anti-lock brake control system described above, it is presumed that there exists no influence of the torsion torque when the corrected acceleration lies within the predetermined range in which the brake force control can be accomplished on the basis of only the wheel acceleration. Accordingly, the brake force control may be performed in accordance with the control scheme adopted in the conventional anti-lock brake control system.

In a still further preferred mode for carrying out the invention, the control command means may be so designed as to issue to the braking hydraulic pressure regulating means a command for increasing stepwise the brake application pressure when the wheel acceleration falls within a range not smaller than the first predetermined value and smaller than the fourth predetermined value and when the corrected acceleration falls within a range not smaller than the third predetermined value and smaller than the second predetermined value and when the wheel acceleration is lowering.

In a further preferred mode for carrying out the invention, the control command means may be so designed as to issue to the braking hydraulic pressure regulating means a command for holding the brake application pressure unless the wheel acceleration is smaller than a fourth predetermined value and when the corrected acceleration is not smaller than the third predetermined value and is smaller than the second predetermined value.

With the arrangement of the anti-lock brake control system described above, enhanced stability can be assured for the anti-lock brake control.

The invention is further concerned with a method of controlling the brake force in the anti-lock brake control system described above.

Thus, according to another aspect of the invention, there is provided a method of controlling a brake force in an anti-lock brake control system for a motor vehicle for applying brake to the motor vehicle in safety while avoiding occurrence of a wheel-locked state by repeating operation for lowering a braking hydraulic pressure when a wheel speed decreases upon braking to a level at which the wheel-locked state is likely to occur and increasing again the braking hydraulic pressure when the wheel speed is recovered as a result of the lowering of the braking hydraulic pressure, which method includes the steps of detecting a rotation speed of each of the wheels of the motor vehicle, arithmetically determining acceleration of the wheel on the basis of the wheel speed, detecting a torsion torque applied to a driving shaft operatively connecting each of the wheels to driving means, arithmetically determining a corrected acceleration by correcting the wheel acceleration with the torsion torque, issuing commands for controlling the brake force to be applied to the wheel in dependence on combination statuses of the wheel acceleration and the corrected acceleration, respectively, and controlling the braking hydraulic pressure in accordance with the command.

Since the method mentioned above and others which will become apparent can be prepared as a program stored in a ROM incorporated in a microcomputer so that the method can be executed by the microcomputer, it is contemplated that such microcomputer or memory storing the control method even in the form of a program is to be covered by the present invention.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

General Description

Before entering into detailed description of exemplary or preferred embodiments of the anti-lock brake control system according to the present invention, the concept or principle underlying the invention will first be described by referring to FIG. 1.

Figure 1:
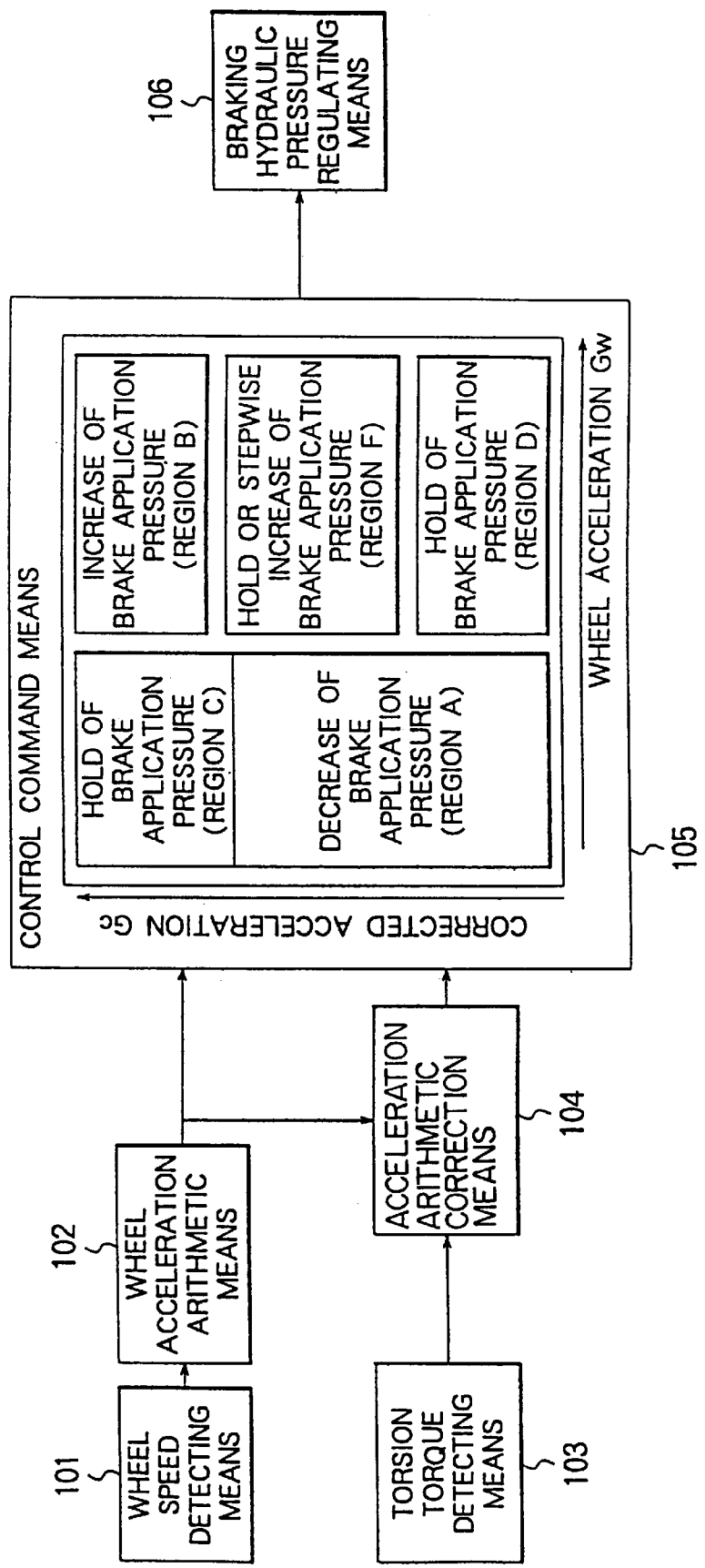
FIG. 1 is a functional block diagram for illustrating conceptually a configuration of the anti-lock brake control system according to the invention.

FIG. 1 is a block diagram showing schematically the basic concept of the present invention. Referring to the figure, the anti-lock brake control system is composed of a wheel speed detecting means 101 for detecting a rotation speed of each of the wheels of a motor vehicle, a wheel acceleration arithmetic means 102 for arithmetically determining acceleration of the wheel on the basis of the wheel speed determined by the wheel speed detecting means 101, a torsion torque detecting means 103 for detecting a torsion torque applied to a drive shaft provided for each of the wheels and operatively coupled to a prime mover such as internal combustion engine or the like, acceleration arithmetic correction means 104 for arithmetically determining a corrected acceleration by correcting the wheel acceleration derived from the wheel acceleration arithmetic means 102 with a torsion torque detected by the torsion torque detecting means 103, a control command means 105 for dividing a control procedure into several regions in dependence on the status of the wheel acceleration and that of the corrected acceleration to thereby issue a command for controlling the brake force in dependence on the region within which the wheel acceleration and/or the corrected acceleration falls, and a braking hydraulic pressure regulating means 106 for controlling the brake force applied to the wheels on the basis of the command mentioned above.

In the anti-lock brake control system of the structure described above, the rotation speed of each of the individual wheels of the motor vehicle is detected by the wheel speed detecting means 101, the output of which is then inputted to the wheel acceleration arithmetic means 102 where the wheel acceleration is arithmetically determined. On the other hand, the torsion torque applied to the drive shaft for each of the wheels is detected by the torsion torque detecting means 103. The outputs of both the wheel acceleration arithmetic means 102 and the torsion torque detecting means 103 are inputted to the acceleration arithmetic correction means 104 which determines the corrected acceleration by correcting the wheel acceleration with the torsion torque. The control command means 105 serves for dividing the control procedure into several regions in dependence on the status of the wheel acceleration and that of the corrected acceleration to thereby issue a signal for controlling the brake force in dependence on the region within which the wheel and the corrected acceleration falls. In response to the control signal, the braking hydraulic pressure and hence brake force is controlled by the braking hydraulic pressure regulating means 106.

Now, the present invention will be described in detail in conjunction with what is presently considered as preferred or typical embodiments thereof by reference to the drawings. In the description, like reference characters designate like or corresponding parts throughout the several views. Also in the following description, it is to be understood that such terms as "left", "right", "rear", "front" and the like are words of convenience and are not to be construed as limiting terms.

Embodiment 1

Figure 2:
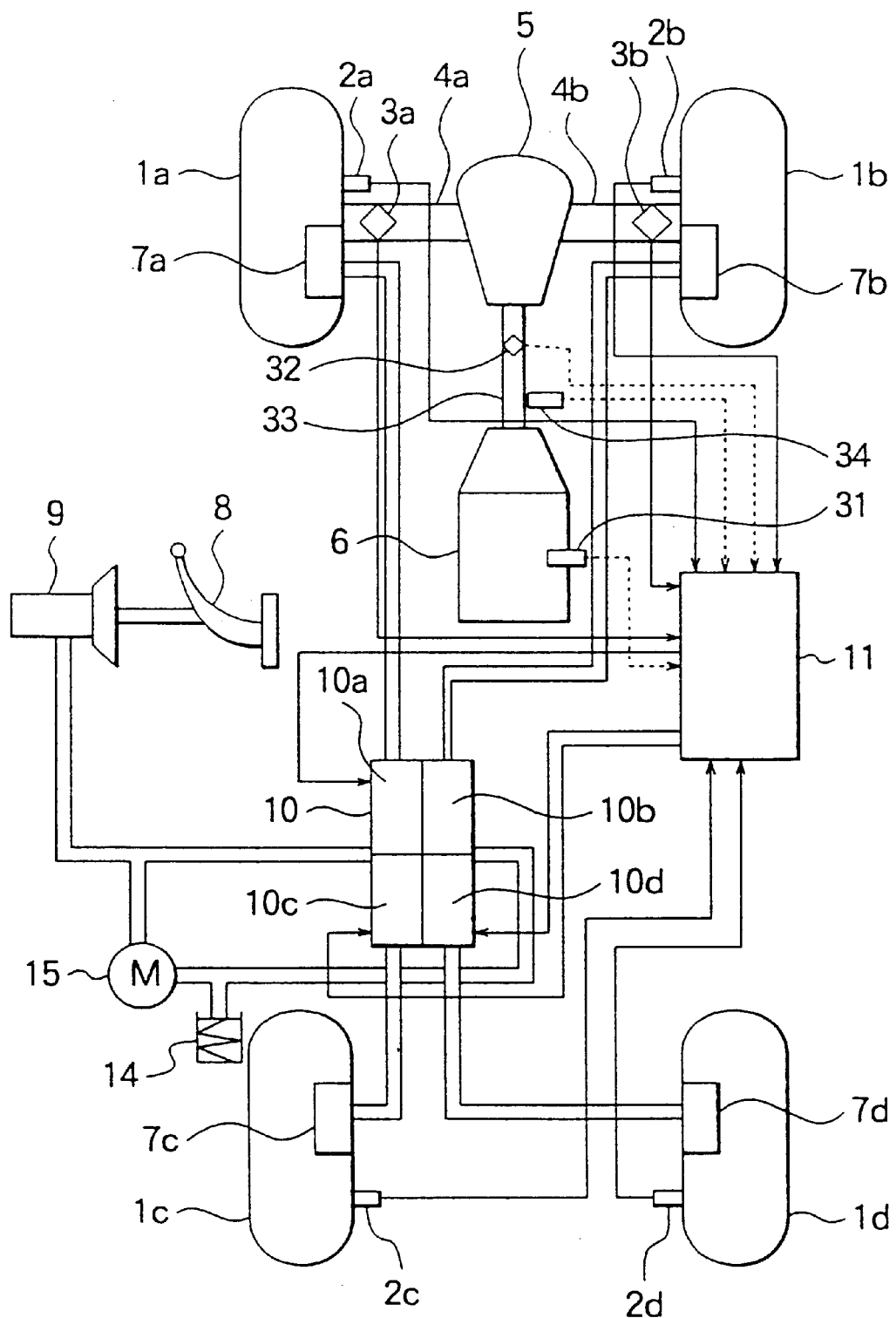
FIG. 2 is a schematic diagram showing a general arrangement of the anti-lock brake control system for a motor vehicle according to an embodiment of the present invention.
Figure 3:
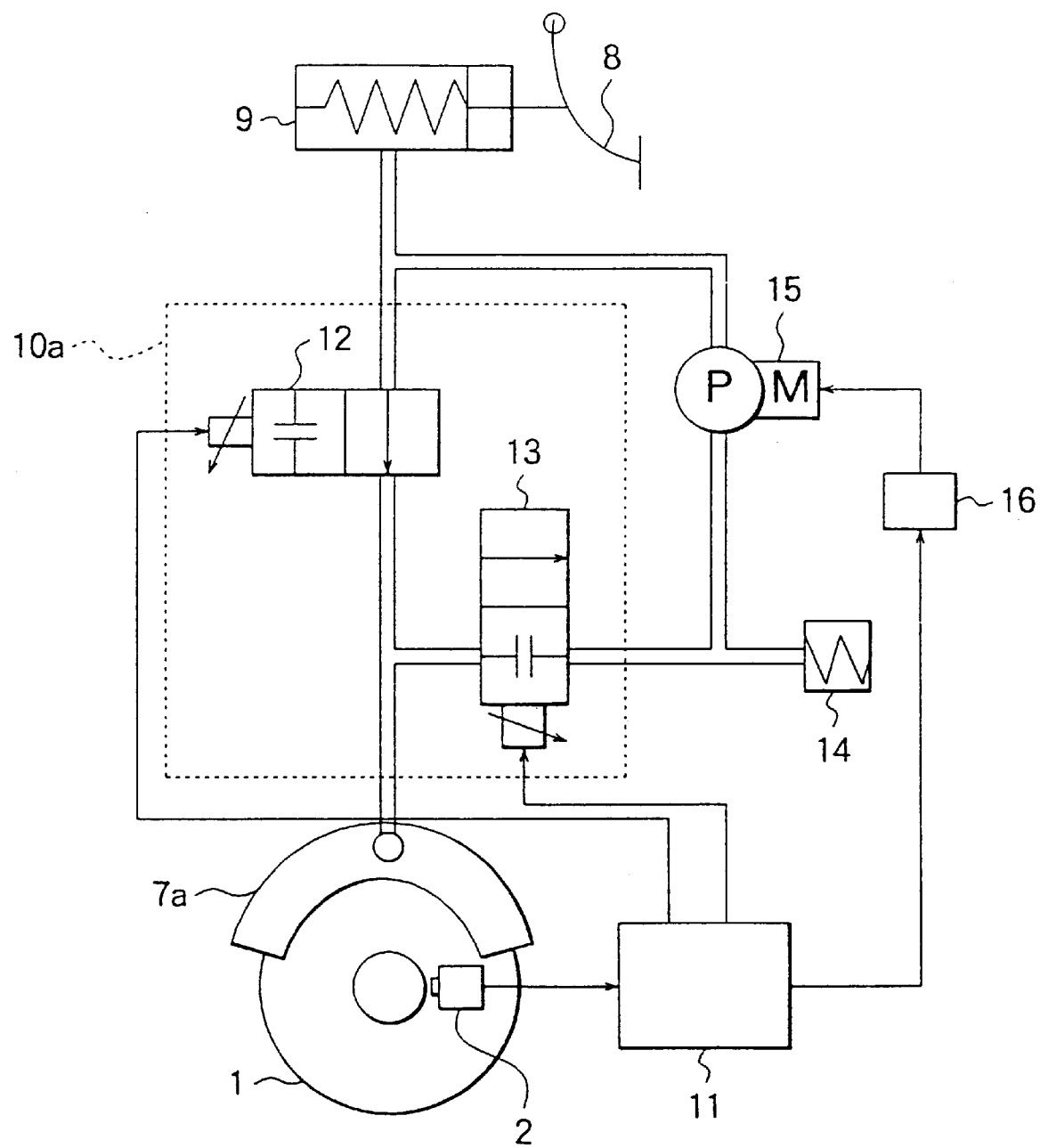
FIG. 3 is a diagram showing in detail a structure of an actuator system employed as a braking hydraulic pressure regulating means provided in association with wheels of a motor vehicle in the anti-lock brake control system shown in FIG. 3.
Figure 4:
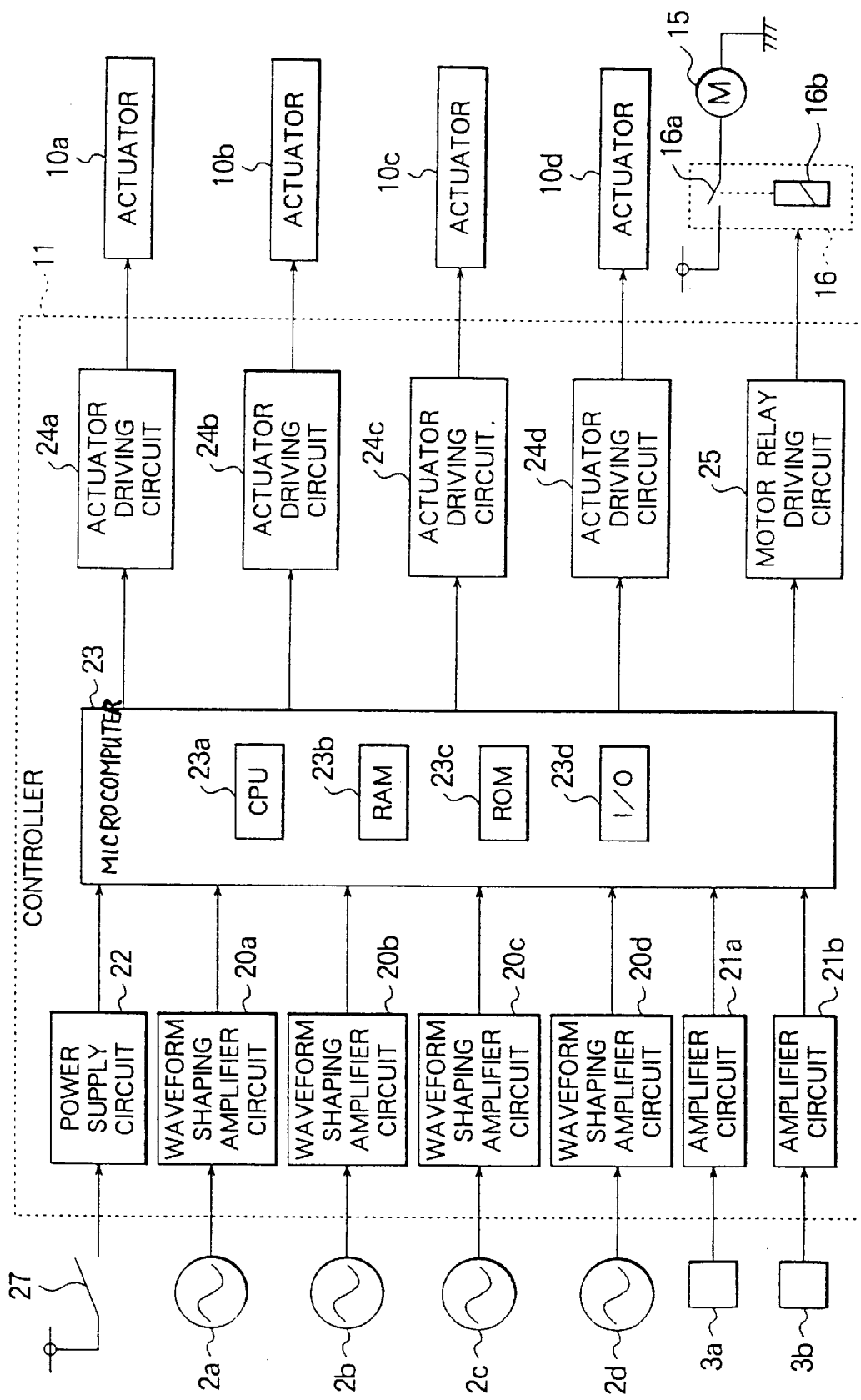
FIG. 4 is a block diagram showing in detail a configuration of a controller employed in the system shown in FIGS. 2 and 3.

An anti-lock brake control system installed on a motor vehicle according to a first embodiment of the present invention will now be described by referring to FIGS. 2 to 4, in which FIG. 2 is a schematic diagram showing a general arrangement of the anti-lock brake control system, FIG. 3 is a diagram showing in detail a structure of an actuator shown in FIG. 2, and FIG. 4 is a block diagram showing in detail a system configuration of a controller shown in FIG. 4.

As shown in FIG. 2, mounted in the vicinity of individual wheels 1a to 1d of the motor vehicle are wheel speed sensors 2a to 2d (designated generally by reference numeral 2) each of which may be constituted by an electromagnetic pick-up type sensor or photoelectric transducer type sensor known per se. These wheel speed sensor 2a to 2d serve to generate rotation speed signals indicative of the rotation speeds (rpm) of the associated wheels 1a to 1d, respectively. Parenthetically, these wheel speed sensors 2a to 2d cooperate to constitute the aforementioned wheel speed detecting means 101 in the anti-lock brake control system according to the invention.

Of the wheels 1a to 1d, the driving wheels 1a and 1b are operatively coupled to an internal combustion engine (hereinafter simply referred to as the engine) 6 of the motor vehicle by way of axle shafts 4a and 4b, a differential mechanism 5 and a drive shaft 33, wherein the axle shafts 4a and 4b (also designated by reference numeral 4 collectively) are provided with torque sensors 3a and 3b (also designated by reference numeral 3 collectively) for detecting torsion torque applied to the axle shafts 4a and 4b, respectively. Parenthetically, the axle shaft (4a, 4b) may also be referred as the drive shaft. When the motor vehicle of concern is a front-wheel driving type, the front wheels serve as the driving wheels 1a and 1b with the rear wheels serving as the follower wheels 1c and 1d. On the other hand, in the case of a motor vehicle of the rear-wheel driving type, the rear wheels function as the driving wheels 1a and 1b. The torque sensors 3a and 3b are installed in association with the driving wheels.

In more concrete, each of the torque sensors 3a and 3b are constituted as described below. That is, each of the torque sensors is implemented in the form of a bridge-circuit type strain gauge mounted on each of the axle shafts 4a and 4b so that the strain gauge undergoes distortion corresponding to the magnitude of torsion torque applied to the associated axle shaft 4a; 4b, wherein the distortion is detected as a change in the voltage appearing across both terminals of the bridge circuit constituting the strain gauge. The voltage signal derived from the strain gauge is amplified to be sent to a controller 11 via a slip ring or in the form of a radio signal. In this manner, the outputs of the torque sensors 3a and 3b mounted on the axle shafts 4a and 4b can be transmitted to the controller 11. Parenthetically, the torque sensors 3a and 3b cooperates to constitute the torsion torque detecting means 103 in the anti-lock brake control system according to the invention.

Provided in association with the wheels 1a to 1d are braking devices 7a to 7d, respectively, which serve as the braking means.

A master cylinder 9 is operatively connected to a brake pedal 8 by way of a transmitting means such as a rod. When the brake pedal 8 is depressed, a brake application pressure of a magnitude corresponding to the depression stroke of the brake pedal 8 is generated by the master cylinder 9. The brake application pressure generated by the master cylinder 9 is adjusted or regulated by the actuator means 10 in accordance with the output of the controller 11, as will be described in detail hereinafter, whereupon the brake application pressure is sent to the braking devices 7a to 7d, respectively. The actuator means 10 is constituted by actuators 10a to 10d corresponding to the braking devices 7a to 7d provided in association with the wheels 1a to 1d, respectively. Incidentally, the actuator means 10 constitutes a braking hydraulic pressure regulating means.

The controller 11 is designed to receive the signals from the wheel speed sensors 2a to 2d and the torque sensors 3a and 3b for performing arithmetic operations and control processings for the anti-lock brake control on the basis of the signals mentioned above to thereby generate output signals for driving the actuator means 10.

The actuator means 10 is constituted by the actuators 10a to 10d in such a structure as shown in FIG. 3. Since the actuators 10a to 10d constituting the actuator means 10 are realized in a same structure, the description will be directed to the actuator 10a as the representative, being understood that the following description holds essentially true for the other actuators 10b, 10c and 10d.

The actuator 10a includes a pressure-holding solenoid valve 12 installed in a hydraulic pipe extending from the master cylinder 9 to the braking device 7a and a pressure-reducing solenoid valve 13 installed in a hydraulic fluid recovering pipe which extends from the braking device 7a to the master cylinder 9 by way of a reservoir tank 14 and a hydraulic fluid recovery pump 15. Operations of the pressure-holding solenoid valve 12 and the pressure-reducing solenoid valve 13 are effectuated by electrically energizing or deenergizing the solenoids thereof under the control of the controller 11. Further, a reference numeral 16 denotes a motor relay for turning on/off the power supply to an electric motor incorporated in a pump 15 in dependence on the output of the controller 11.

Now, description will turn to the operation of the actuator means 10. When the brake pedal 8 is depressed, a hydraulic pressure is applied to the master cylinder 9, as a result of which a brake fluid or oil flows from the master cylinder 9 into the braking device 7a, . . . , 7d by way of the pressure-holding solenoid valve 12 of the actuator 10a 10d, whereby the brake application pressure within the braking device 7a, . . . , 7d is increased.

When a pressure-reducing signal is outputted from the controller 11, the pressure-holding solenoid valve 12 and the pressure-reducing solenoid valve 13 are electrically energized, which results in that the brake fluid passage extending between the master cylinder 9 and the braking device 7a, . . . , 7d is interrupted or closed, whereas a brake fluid passage between the braking device 7a, . . . , 7d and the reservoir tank 14 is opened. Consequently, the braking hydraulic pressure within the braking device 7a, . . . , 7d is released to the reservoir tank 14, whereby the brake application pressure is reduced or lowered. At the same time, the motor relay 16 is closed, whereby the motor of the hydraulic fluid recovery pump 15 is put into operation. As a result of this, the hydraulic pressure within the reservoir tank 14 is increased. The hydraulic fluid within the reservoir tank 14 is thus fed back to the master cylinder 9 in preparation for the succeeding control.

Thereafter, when a hold signal is outputted from the controller 11, only the pressure-holding solenoid valve 12 is electrically energized, whereby all the braking hydraulic pressure paths are interrupted.

On the other hand, when a pressure-increasing signal is issued from the controller 11, the electric currents supplied to the pressure-holding solenoid valve 12 and the pressure-reducing solenoid valve 13 are interrupted, which results in that the hydraulic paths between the master cylinder 9 and the braking device 7a, . . . , 7d are again established. As a consequence, the high-pressure brake fluid fed back to the master cylinder 9 as well as the brake fluid discharged from the hydraulic fluid recovery pump 15 is caused to flow into the braking device 7a, . . . , 7d, whereby the brake application pressure is increased.

As will now be appreciated from the above, the brake application pressure is adjusted or regulated by repeating the pressure reducing operation, the pressure holding operation and the pressure increasing operation in accordance with the commands issued from the controller 11. In this way, the wheels of the motor vehicle are protected against being locked.

The controller 11 is implemented in such a circuit configuration as shown in FIG. 4. Referring to FIG. 4, the controller 11 includes waveform shaping circuits 20a, 20b, 20c and 20d (designated representatively by reference numeral 20) which serve for shaping the output signals of the wheel speed sensors 2a, 2b, 2c and 2d into signal pulses suitable for the processings executed by a microcomputer 23, amplifier circuits 21a and 21b for converting the output signals of the torque sensor 3a and 3b into digital signals suited for the processings executed by the microcomputer 23, and a power supply circuit 22 for supplying a predetermined constant voltage to the microcomputer 23 when an ignition switch 27 is turned on. The microcomputer 23 includes a CPU (Central Processing Unit) 23a, a RAM (Random Access Memory) 23b, a ROM (Read-Only Memory) 23c, an input/output interface 23d and others. Further, the controller 11 includes actuator driving circuits 24a, 24b, 24c and 24d (designated representatively by numeral 24) which output driving signals for driving the actuators 10a, 10b, 10c and 10d, respectively, in response to relevant control signals outputted from the microcomputer 23, and a driving circuit 25 for electrically energizing a coil 16b of the motor relay 16 to thereby turn on or close a normally opened contact 16a of the relay 16.

Figure 5:
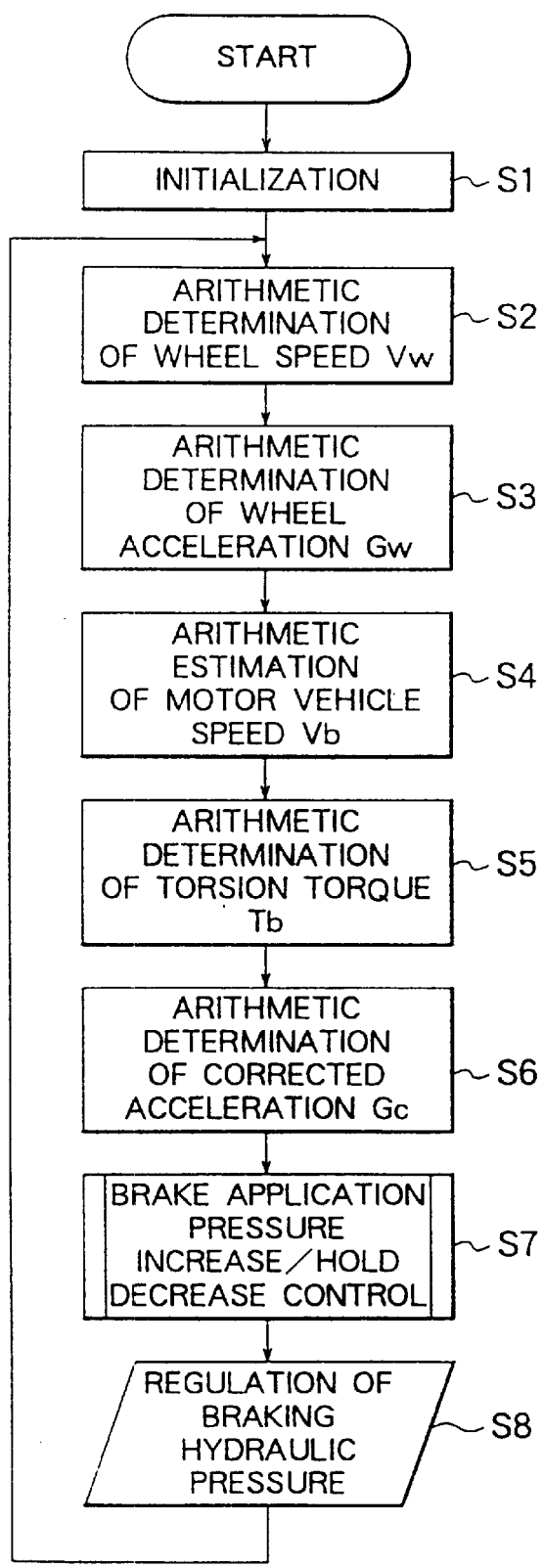
FIG. 5 is a flow chart for illustrating a flow of processings executed by a microcomputer incorporated in the controller according to an embodiment of the invention.
Figure 6:
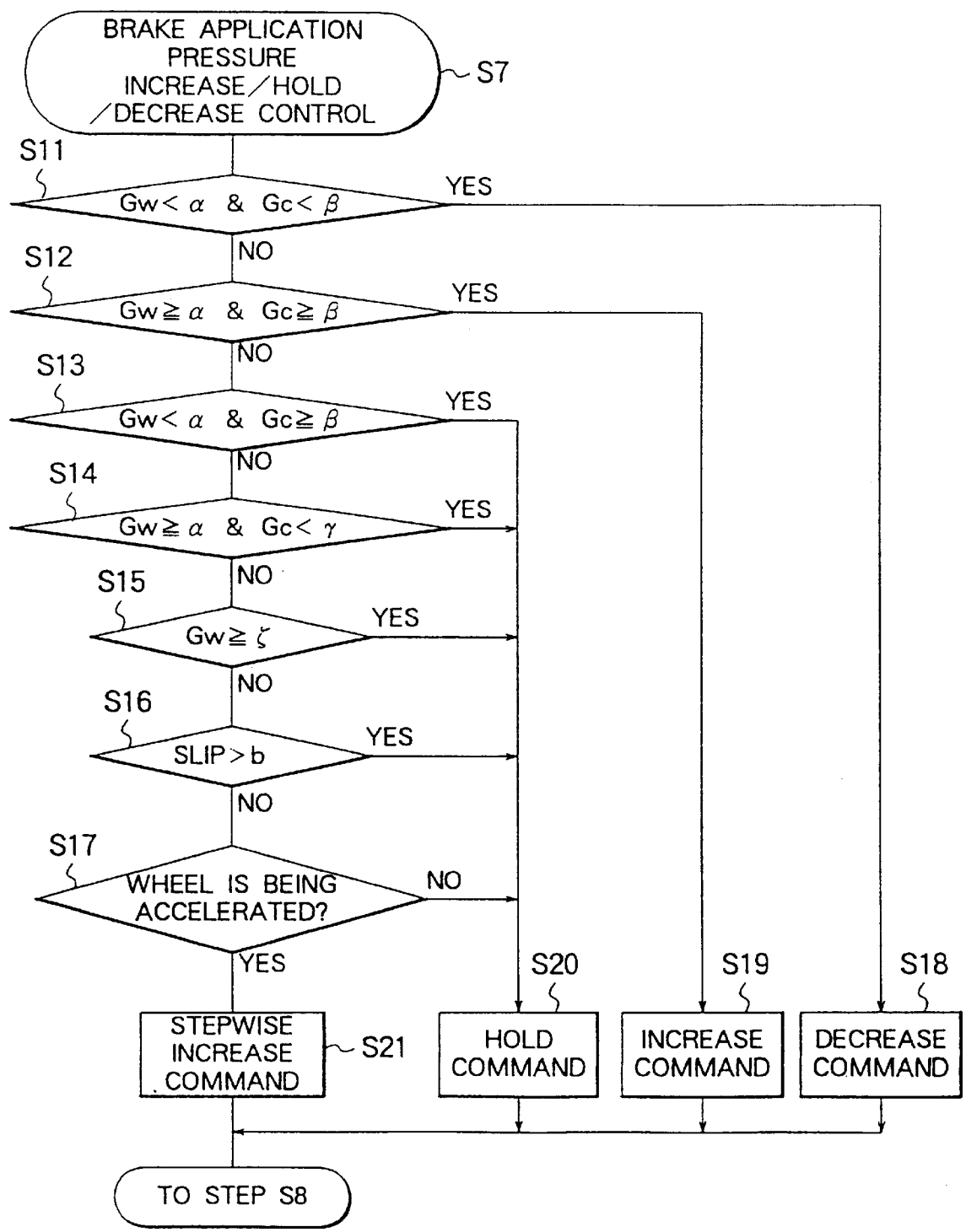
FIG. 6 is a flow chart for illustrating generally a flow of brake application pressure controls according to an embodiment of the invention.

Next, referring to flow charts shown in FIGS. 5 and 6, description will be directed to the operations of the microcomputer 23 incorporated in the controller 11 of the structure described above. At first, general processing flow will be explained by reference to FIG. 5. In a step S1, initialization of the RAM 23b and the input/output interface 23d is performed.

Subsequently, the wheel speed Vw is arithmetically determined in a step S2. More specifically, upon reception of the pulse signals having the pulse frequencies indicative of the rotation speeds of the individual wheels 1a, . . . , 1d from the waveform shaping amplifier circuits 20a, . . . , 20d, the microcomputer 23 starts the wheel speed arithmetic processing (step S2) and starts in succession the counting of the pulse number Pn for the purpose of measuring the time lapse Tn from the start of the pulse counting operation. On the basis of the value of the count value Pn and the time lapse Tn thus obtained, the wheel speed Vw is calculated in accordance with the following expression (5):

$$Vw=Kv \cdot (Pn/Tn) \quad (5)$$

where Kv represents a coefficient or constant which can be determined in consideration of the diameter of the wheel, characteristics of the wheel speed sensor 2 and other factors. At this juncture, it should be mentioned that the above-mentioned process for determining the wheel speed Vw is only by way of example, and other method may be resorted to.

0041

In a succeeding step S3, the wheel acceleration Gw is arithmetically determined on the basis of the wheel speed Vw determined in the step S2. To this end, a difference between the wheel speed Vw determined in the step S2 during the currently executed processing period TL on one hand and the wheel speed Vw1 determined in the corresponding step S2 in the immediately preceding processing period on the other hand is determined, whereon the wheel acceleration Gw is arithmetically determined on the basis of the difference mentioned above and the period TL in accordance with the following expression (9):

$$Gw=Kg \cdot (Vw-Vw1)/TL \quad (6)$$

where Kg represents a constant. The wheel acceleration Gw indicates that the wheel rotation is being accelerated when the wheel acceleration Gw is of a plus sign (i.e., when Gw>0 (zero)), while the wheel acceleration Gw of minus sign (i.e., Gw<0) indicates that the wheel speed is being decelerated.

In a step S4, an estimated vehicle speed Vb is determined on the basis of the wheel speed Vw of the wheel 1a, . . . , 1d. As an estimating method to this end, the greatest one of the values derived by decreasing the vehicle speed Vb1 obtained one control period before at a gradient or rate of −1 g and the highest one of the wheel speeds Vw of the four wheels 1a to 1d may be selected as the estimated vehicle speed Vb.

In a step S5, a torsion torque Tt is determined. More specifically, the voltage signals outputted from the torque sensors 3a and 3b mounted on the axle shafts 4a and 4b, respectively, are inputted to the microcomputer 23 after having been amplified by the amplifier circuits 21a and 21b, respectively. On the basis of digital values obtained after A/D converter (analogue to digital conversion) of these input signals, the torsion torque Tt is arithmetically determined by the microcomputer 23.

In a step S6, the corrected acceleration Gc is arithmetically determined on the basis of the wheel acceleration Gw and the torsion torque Tt in accordance with the expression (3) mentioned hereinbefore. Namely, $$Gc=Gw+(Kr/Iw) \cdot Tt \quad (3)$$

In a processing step S7, the brake application pressure is controlled by issuing the hydraulic pressure decreasing, holding or increasing command. The processing in this step S7 will be elucidated in detail later on.

In a step S8, signals are supplied from the controller 11 to the actuator 10a, . . . , 10d on the basis of the command determined in the step S7, whereon the brake application pressure increasing/decreasing control processing is performed. Because the actuator 10a, . . . , 10d has only the three operation modes, i.e., the braking hydraulic pressure decreasing mode, the braking hydraulic pressure holding mode and the braking hydraulic pressure increasing mode, the braking hydraulic pressure holding signal is periodically interposed intermittently in the braking hydraulic pressure increasing signal in order to suppress the gain for increasing the braking hydraulic pressure when the brake application pressure is to be increased gradually or stepwise, i.e., with a smaller gain, to thereby increase progressively or stepwise the hydraulic pressure. Similar control may equally be adopted for decreasing gradually or stepwise the brake application pressure.

After execution of the processing steps mentioned above, the step S2 is resumed when the control period of a predetermined time duration has lapsed. This processing procedure is repeated until the ignition switch 27 is opened.

Figure 7:
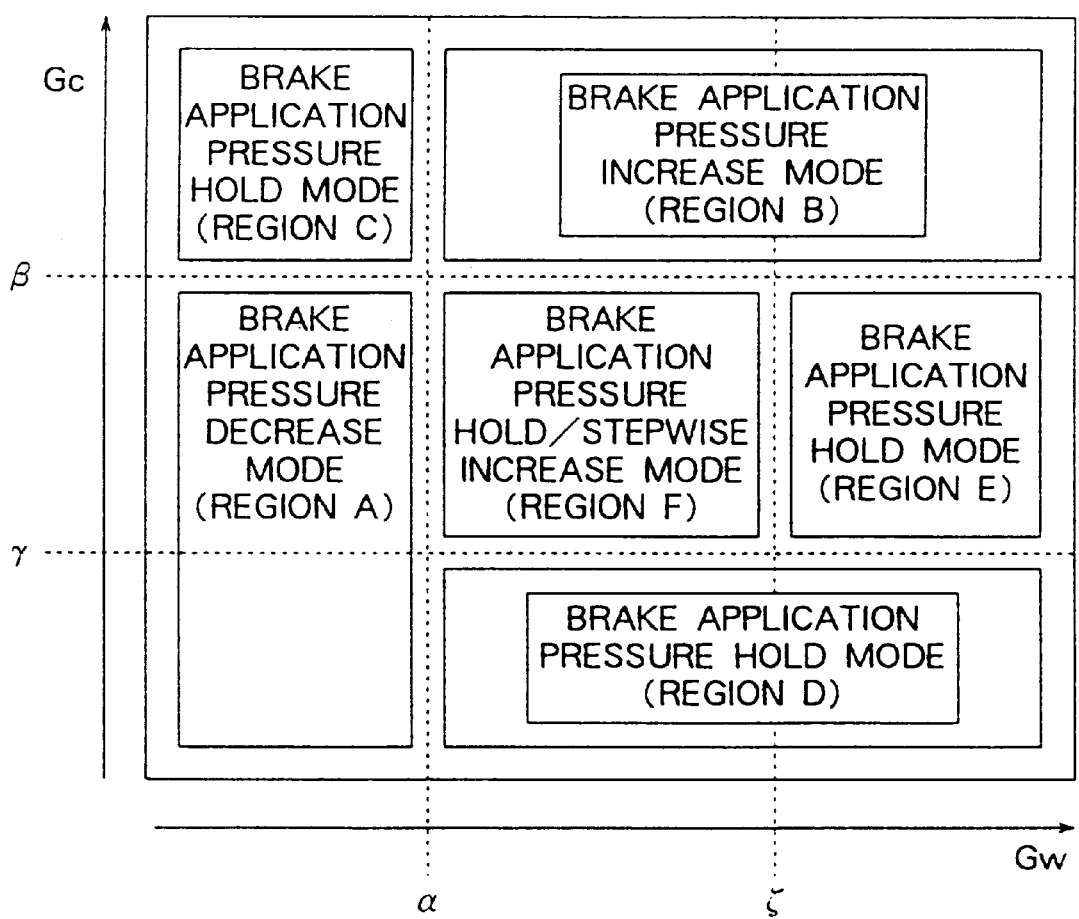
FIG. 7 is a view showing a Gc–Gw map containing control regions in which brake force is controlled in different manners as a function of the corrected acceleration and the wheel acceleration according to an embodiment of the invention.

Now, the brake application pressure control step S7 will be described by reference to FIGS. 6 and 7, in which FIG. 6 shows a flow chart for illustrating a brake application pressure control procedure and FIG. 7 is a control region (hereinafter also referred to as the Gc–Gw map) where the corrected acceleration Gc is taken along the ordinate with the wheel acceleration Gw being taken along the abscissa. The Gc–Gw map shows relations between the brake application pressure control and the statuses of the corrected acceleration Gc and the wheel acceleration Gw in the form of a map of brake application pressure control regions for illustrating determination of the braking hydraulic pressure increasing/holding/decreasing command in dependence on the states of the wheel which in turn is determined on the basis of the wheel acceleration Gw and the corrected acceleration Gc.

At first, in a step S11, decision is made as to whether the conditions for releasing or decreasing the brake application pressure (region A in the Gc–Gw map shown in FIG. 7) is satisfied or not. More specifically, unless the wheel acceleration Gw attains a first predetermined value a and when the corrected acceleration Gc is short of a second predetermined value $\beta$, the processing proceeds to a step S18 where the brake application pressure decreasing command is issued. On the other hand, when the above conditions are not met, the processing proceeds to a step S12.

By way of example, let's suppose that a torsion torque Tt acts on the wheel as the brake force. In that case, the wheel acceleration becomes significantly low. In this conjunction, it will be recalled that the corrected acceleration is derived by correcting the wheel acceleration additively with the torsion torque, as mentioned hereinbefore. Thus, it can be decided on the basis of the corrected acceleration that the wheel speed is decelerating under the action of the torsion torque. Accordingly, unless the corrected acceleration satisfies the condition for the deceleration, the brake application pressure deceasing control is inhibited. In this conjunction, it is again to be noted that some delay may be involved in the decision based on the corrected acceleration Gc because of possibility of a delay in the detection of the torsion torque for the reason mentioned previously. With a view to avoiding the influence of such delay, the condition for allowing the brake application pressure to decrease is determined by logically ANDing the condition that the corrected acceleration $Gc<\beta$ and the condition that the wheel acceleration $Gw<\alpha$. To say in another way, the decision for decreasing the brake application pressure is not made on the basis of only the corrected acceleration Gc but both the corrected acceleration Gc and the wheel acceleration Gw are taken into consideration.

In a step S12, decision is made as to whether the condition for increasing the brake application pressure is met, i.e., whether both the wheel acceleration Gw and the corrected acceleration Gc fall within a range corresponding to the region B in the Gc–Gw map shown in FIG. 7. More specifically, when the value of the wheel acceleration Gw is greater than the first predetermined value $\underline{\alpha}$ inclusive (i.e., when $Gw>\alpha$) and when the value of the corrected acceleration Gc is greater than the second predetermined value $\beta$ inclusive (i.e., when $Gc \geq \beta$), then the processing proceeds to a step S19 to issue a brake application pressure increase command. Unless both the conditions in the step S12 are satisfied, the processing proceeds to a step S13.

When no torsion torque acts on the drive shaft in the course of increasing the brake application pressure in succession to the decrease of the brake application pressure, the wheel speed will rapidly increase to a speed equivalent to the vehicle speed. In other words, the wheel acceleration increases. However, when the torsion torque acts as a brake force, the wheel acceleration will increase only slightly. Such small increase of the wheel acceleration can however be determined on the basis of the corrected acceleration Gc to thereby control the actuator means to increase the brake application pressure. In this way, even in the case where the wheel acceleration increases only slightly under the action of the torsion torque, the brake application pressure can be increased adequately.

In the step S13, decision is made as to whether the conditions for holding the brake application pressure are met or not (i.e., whether the corrected acceleration Gc and the wheel acceleration Gw fall within a range corresponding to the region C in the Gc–Gw map shown in FIG. 7). More specifically, when the wheel acceleration Gw is smaller than the first predetermined value $\underline{\alpha}$ (i.e., when $Gw<\alpha$) and when the corrected acceleration Gc is greater than the second predetermined value $\beta$ inclusive (i.e., when $Gc \geq \beta$), then the processing proceeds to a step S20 where the brake application pressure hold command is issued.

Although the corrected acceleration Gc greater than the first predetermined value $\underline{\alpha}$ inclusive indicates that the brake application pressure should be increased, the wheel acceleration Gw smaller than second predetermined value $\beta$ indicates that slip of the wheel is taking place and may increase. In that case, increasing of the braking hydraulic pressure and hence the brake application pressure will incur increasing of the slip even though it may be transient, which means that the running stability or controllability of the motor vehicle may be impaired more or less. Accordingly, when the conditions shown in the step S13 are met, the processing proceeds to the step S20 to hold or sustain the currently effective brake application pressure level while inhibiting the braking hydraulic pressure from increasing or decreasing.

Unless both the conditions in the processing step S13 are met (i.e., when the decision step S13 results in negation "NO"), the processing proceeds to a step S14 where decision processing is performed to decide whether the wheel acceleration Gw is greater than the first predetermined value $\underline{\alpha}$ inclusive and whether the corrected acceleration Gc is smaller than a third predetermined value $\gamma$, i.e., whether both the wheel acceleration Gw and the corrected acceleration Gc fall within a range corresponding to a region D in the Gc–Gw map shown in FIG. 7. When the wheel acceleration Gw is greater than the first predetermined value $\underline{\alpha}$ inclusive (i.e., when $Gw \geq \alpha$) and when the corrected acceleration Gc is smaller than the third predetermined value $\gamma$ (i.e., when $Gc<\gamma$), then the processing proceeds to the step S20 where the brake application pressure hold command is issued.

More specifically, when the brake application pressure is adequate for the reaction force of the road surface without any appreciable torsion torque taking place in the drive shaft, decreasing of the braking hydraulic pressure is started because the wheel speed decreases sufficiently in the state mentioned above. However, when the torsion torque takes place and acts as a driving force, the wheel speed does not decrease rapidly due to the action of the torsion torque, even when a sufficiently high braking hydraulic pressure is applied. In that case, when the torsion torque acting as the driving force decreases, the rotation speed of the wheel starts to decrease steeply. In such situation, it is preferred to hold the current brake force to sustain the adequate brake force without increasing the braking hydraulic pressure unnecessarily instead of promoting the deceleration of the wheel by increasing the braking hydraulic pressure which may bring about high brake force. Thus, when the value of the wheel acceleration Gw is greater than the first predetermined value $\underline{\alpha}$ inclusive ($Gw \geq \alpha$) and when the corrected acceleration Gc is smaller than the third predetermined value $\gamma$ ($Gc<\gamma$), i.e., when the decision step S14 results in affirmation "YES", the brake application pressure hold command is issued in the step S20.

Unless the conditions in the step S14 are met, the processing proceeds to a step S15 where the decision processing is executed for deciding whether or not the brake application pressure holding condition corresponding to a region E in the Gc–Gw map shown in FIG. 7 is met. More specifically, in the step S15, it is decided whether or not the wheel acceleration Gw is greater than a fourth predetermined value $\zeta$ inclusive. When the answer of this decision step S15 is affirmative "YES", the processing proceeds to the step S20 where the brake application pressure hold command is issued. In this conjunction, it is to be noted that since the step S15 is executed when the conditions in the steps S11 to S14 are not met, the range or region in which the condition for holding the brake application pressure is met is much limited (i.e., $Gw \geq \zeta$ and $\gamma \leq Gc < \beta$).

When the wheel acceleration Gw falls within the range of the corrected acceleration Gc (i.e., when wheel acceleration Gw is greater than the fourth predetermined value $\zeta$ inclusive), this means that the wheel is less susceptible to the influence of the torsion torque and thus can easily follow the change of the braking hydraulic pressure. In that case, the wheel remains substantially insusceptible to the influence of the torsion torque even when the braking hydraulic pressure is increased. Rather, the torsion torque tends to be prevented from increasing.

When it is decided in the step S15 that the conditions for holding the brake application pressure are not met (i.e., when $\alpha \leq Gw$ $\zeta$ and when $\alpha \leq Gc < \beta$), then the processing proceeds to a step S16 where decision processing is executed to decide whether the condition for stepwise increasing the brake application pressure or the condition for holding the brake application pressure are met (i.e., whether or not the corrected acceleration Gc and the wheel acceleration Gw falls within a region F in the Gc–Gw map shown in FIG. 7). More specifically, when difference between the estimated vehicle speed obtained in the step S4 and the wheel speed (i.e., the difference indicating the magnitude of the slip of the wheel) is greater than a fifth predetermined value $b$, the processing proceeds to the step S20 for holding the currently effective brake application pressure. If otherwise, a step S17 is executed.

In the step S17, decision is made whether or not the wheel acceleration Gw is increasing. If so, then the step S21 is executed, whereby the command for stepwise increasing the brake application pressure is issued. If otherwise, the processing proceeds to the step S20 for holding the currently effective brake application pressure. As a means for detecting that the wheel acceleration is increasing, there may be adopted a method of determining a difference between the wheel acceleration determined in the current processing routine and that determined in the immediately preceding routine, wherein when the difference is greater than zero, it can be decided that the wheel acceleration is increasing.

The anti-lock brake control processing described above is executed for each of the brake devices provided in association with the individual wheels, respectively. In this conjunction, it is noted that in the anti-lock brake control for the driving wheels $1a$ and $1b$, the wheel acceleration is corrected with the torsion torque, whereon the brake application pressure increase/hold/decrease control is performed for the braking device $7a$, $7b$ associated with the driving wheel $1a$, $1b$. However, in the case of the follower wheels (i.e., non-driving wheels) $1c$ and $1d$, no torsion torque occurs in the associated axle shafts, differing from those for the driving wheels $1a$ and $1b$. Accordingly, in the anti-lock brake control for the follower or non-driving wheels $1c$ and $1d$, the torsion torque Tt is set equal to zero, and the same control processing as those for the driving wheels $1a$ and $1b$ is executed. Further, when the power transmission from the engine 6 to the driving wheels $1a$ and $1b$ is interrupted by manipulating the clutch, the inertia of the engine 6 does not act on the driving wheels $1a$ and $1b$, which in turn means that substantially no torsion torque occurs in the associated axle shafts. Accordingly, in the state where the driving wheels $1a$ and $1b$ are operatively disconnected from the engine 6, the anti-lock brake control processing is executed on the presumption that the torsion torque Tt is equal to zero.

Figure 8:
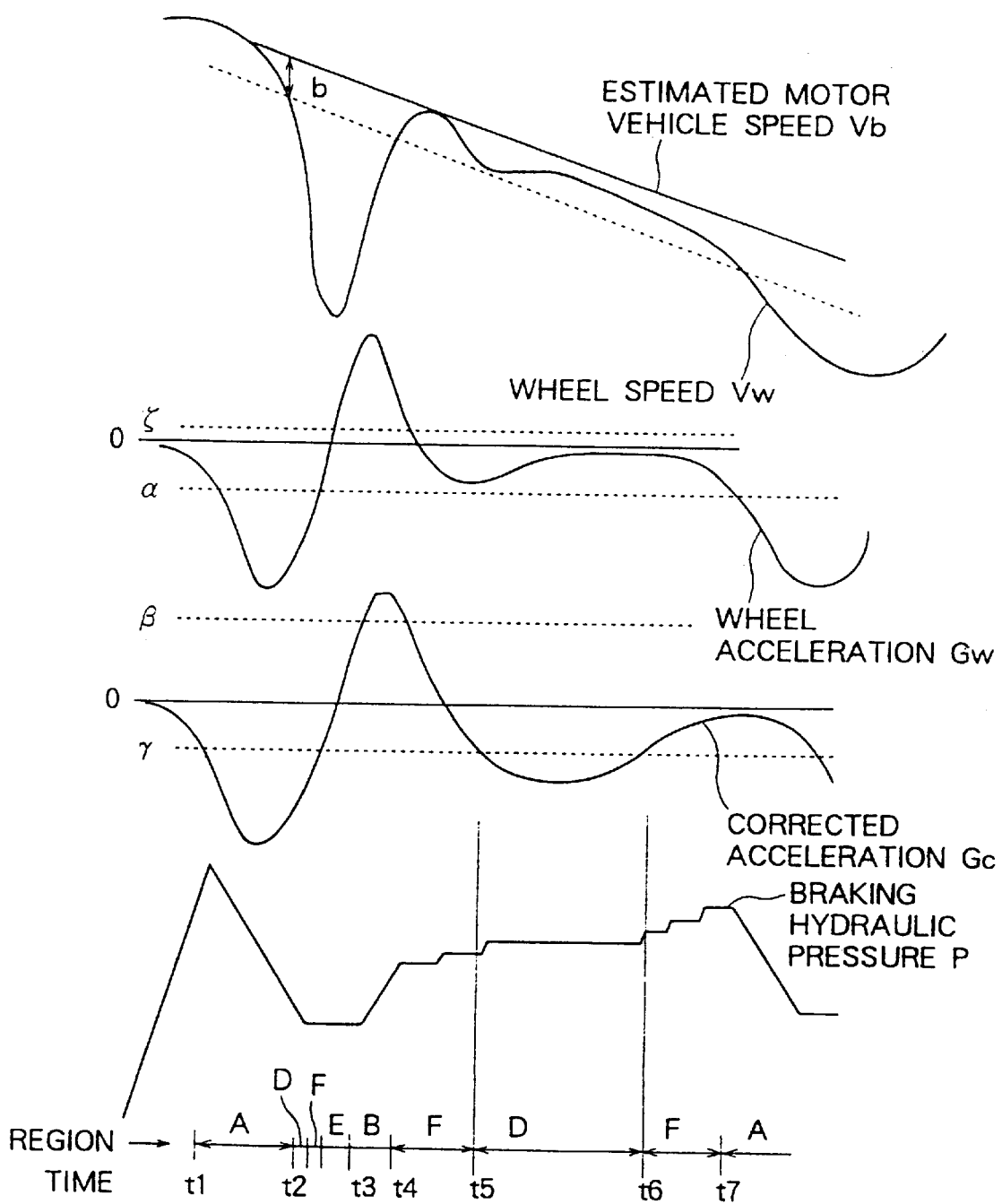
FIG. 8 is a waveform diagram for graphically illustrating brake force control operation procedure according to an embodiment of the invention together with changes of vehicle speed, wheel speed, wheel acceleration and braking hydraulic pressure, respectively.
Figure 9:
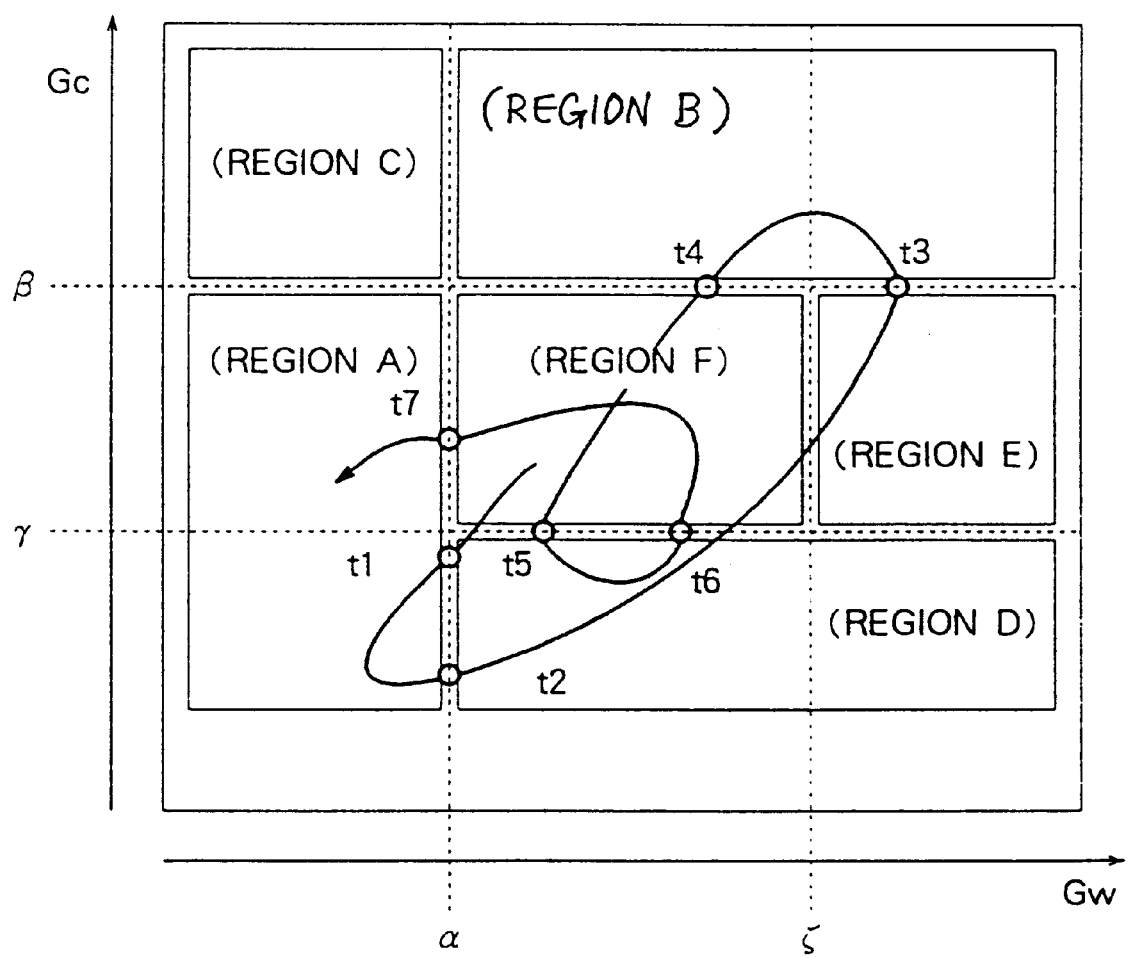
FIG. 9 is a view for illustrating, by way of example, a flow of brake force controls on the Gc–Gw map show in FIG. 7.

Next, operations of the anti-lock brake control system effectuated upon execution of the aforementioned anti-lock brake control processing will be described by reference to FIGS. 8 and 9, in which FIG. 8 is a waveform diagram for illustrating behaviors of the estimated vehicle speed Vb, wheel speed Vw, wheel acceleration Gw, corrected acceleration Gc and braking hydraulic pressure P, respectively, and FIG. 9 is a view showing, by way of example, a Gc–Gw map in which a curve indicating changes in the wheel acceleration Gw and the corrected acceleration Gc is depicted as a function of time lapse. When a large braking hydraulic pressure P makes appearance upon depression of the brake pedal, the brake force exceeds significantly the reaction force of the road surface, incurring steep deceleration of the wheel speed Vw. At a time point t1 (see FIGS. 8 and 9), the corrected acceleration Gc is smaller than the second predetermined value $\beta$ with the wheel acceleration Gw lowering below the first predetermined value $\alpha$. Consequently, both the range corrected acceleration Gc and the wheel acceleration Gw falls within the range corresponding to the region A shown in FIG. 9. Accordingly, in this region A, the brake application pressure decrease command is issued to decrease the braking hydraulic pressure P.

At a time point t2, the brake force decreases due to reduction of the braking hydraulic pressure after steep sinking of the wheel speed. Namely, the wheel speed tends to increase at the time point t2. Thus, the corrected acceleration Gc and the wheel acceleration Gw fall within a corresponding to the region D (see FIGS. 8 and 9). In other words, status transition from the region A to the region D occurs at the time point t2. In this region D, the braking hydraulic pressure is held by issuing the brake application pressure hold command. In succession, the statuses of the corrected acceleration Gc and the wheel acceleration Gw make transition to the region F and then to the region E under the influence of the torsion torque. In the region F, the brake application pressure hold command is issued without issuing the command for increasing stepwise the brake application pressure because of a large slip of the wheel.

At a time point t3 at which the corrected acceleration Gc exceeds the second predetermined value $\beta$ (i.e., $Gc \geq \beta$), combination of the corrected acceleration Gc and the wheel acceleration Gw makes transition to the region B. In this region B, the brake application pressure increase command is issued to thereby cause the braking hydraulic pressure and hence the brake force to increase.

At a time point t4 at which the corrected acceleration Gc lowers below the second predetermined value $\beta$ (i.e., upon transition from the region B to the region F), the difference between the estimated vehicle speed and the wheel speed becomes smaller than the fifth predetermined value $\beta$ with the wheel acceleration decreasing. Accordingly, the command for increasing stepwise the brake application pressure is issued. In this way, in the region F after the transition at the time point t4, holding and increasing of the braking hydraulic pressure are repeated.

At a time point t5 at which the wheel acceleration increases by some degree with the torsion torque Tt acting as a driving force, the corrected acceleration Gc decreases below the third predetermined value γ. At this time point, however, the brake force is close to the reaction force of the road surface. Accordingly, even when the stepwise increasing of the brake application pressure is continued, the brake force will become lower at a next timing. For preventing such lowering of the brake force to thereby make available a high brake force, it is preferred to maintain the braking hydraulic pressure in the state where the corrected acceleration Gc is smaller than the third predetermined value γ. Consequently, in the region D, the brake application pressure hold command is issued to maintain the current brake force.

At a time point t6 at which the corrected acceleration Gc again exceeds the third predetermined value γ (transition to the region F), a brake application pressure stepwise-increase command is outputted.

At a time point t7 at which the wheel acceleration Gw lowers below the first predetermined value α (transition to the region A), the brake application pressure decrease command is issued.

By repeating the processes described above for thereby increasing and decreasing the braking hydraulic pressure periodically, it is possible to make available the brake force optimal for the reaction force exerted by the road surface.

Embodiment 2

In the anti-lock brake control systems according to the first embodiment of the invention described above, the torsion torque is determined on the basis of the outputs of the torque sensors 3a and 3b implemented in the form of the strain gauges mounted on the axle shafts 4a and 4b, respectively, which are operatively coupled to the individual driving wheels 1a and 1b. It should however be mentioned that when the driving wheels 1a and 1b are operatively coupled to the engine 6 by way of a differential mechanism 5, similar advantageous effects as those of the anti-lock brake control systems according to the first embodiment of the invention can be obtained by mounting a torsion torque detecting sensor 32 on a drive shaft 33 such as a propeller shaft or the like in the structure shown in FIG. 2.

Since the left and right wheels coupled operatively to each other via the differential mechanism are applied with the torsion torque of a same magnitude, the torsion torques applied to the left and right wheels, respectively, become equal to each other. Thus, by detecting the torque applied to the drive shaft 33 coupling the engine and the differential mechanism to each other, the torsion torques applied to the left and right wheels can be determined by detecting the torque applied to the drive shaft 33. In that case, the torsion torque applied to each of the left and right wheels has a value equal to a half of the torque applied to the drive shaft 33. Parenthetically, the drive shaft 33 may also be referred to as the drive shaft as in the case of the axle shaft 4.

Embodiment 3

In the case of the anti-lock brake control system according to the first or second embodiment of the invention, the torsion torque is determined on the basis of the output signals from the torque sensors 3a and 3b constituted by strain gauges mounted on the axle shafts 4a and 4b, respectively, coupled operatively to the individual driving wheels 1a and 1b or alternatively from the torque sensor 32 mounted on the drive shaft 33. However, the torque of concern can equally be detected by detecting the number of rotations of the prime mover such as the engine 6. This concept of the invention is incarnated in a third embodiment of the invention. In the structure of the motor vehicle shown in FIG. 2, the rotation number (rpm) of the engine is detected by the engine rotation sensor 31 which may be constituted by a crank angle sensor known per se. Since the driving wheels 1a and 1b and the engine 6 are operatively coupled through the medium of the differential mechanism 5, the torques applied to the left and right driving wheels are of same magnitude. Accordingly, by detecting a phase relation between the rotation angle of the driving wheel 1a, 1b and that of the engine 6 to thereby determine the phase difference, it is possible to calculate the torsion angle and hence the torsion torque which is proportional to the torsion angle.

More specifically, the rotation angle of the engine 6 is determined on the basis of the output signal from the engine rotation sensor 31, while the rotation angles of the driving wheels 1a and 1b are detected by the wheel speed sensors 2a and 2b, respectively. At a time point at which the torsion torque is of small magnitude with the load of the engine being small, e.g. when the control of the brake application pressure is not yet started, the rotation angles of the driving wheels 1a and 1b and the engine are reset to zero, assuming that there is no phase difference between the driving wheel 1a, 1b and the engine 6. Upon starting of the control of the brake application, the pulses derived from the outputs of the driving wheels 1a and 1b and the engine 6 are counted, respectively. On the basis of the count values, the rotation angles θr and θl of the driving wheels 1a and 1b and the rotation angle θe of the engine 6 are determined according to a method known per se, whereupon the torsion angle θt is determined in accordance with the following expression (7):

$$\theta t = K i \cdot \theta e - (\theta r + \theta l)/2 \qquad (7)$$

Thus, the torsion torque Tt can be determined as a product of the torsion angle θt and rigidity Kp of the drive shaft 33 as follows:

$$T t = K p \cdot \theta t \qquad (8)$$

The torsion torque Tt applied to the left and right driving wheel 1a, 1b is equally applied to the engine 6. When the acceleration pedal 8 is released in the operation state where the anti-lock brake control system (ABS) is operating, the output torque of the engine 6 becomes smaller. In that case, the engine 6 may be regarded as an object exhibiting a great inertia. Accordingly, by detecting the change in the rotation number (engine rotation speed in rpm) ωe of the engine 6 itself, it is possible to determine the torsion torque applied to the driving wheels 1a and 1b in accordance with the following expression (9):

$$T t = K (d\omega e/dt) \qquad (9)$$

As is apparent from the above, the torsion torque can be arithmetically determined on the basis of the rotation angles of the driving wheels 1a and 1b and that of the engine 6 or on the basis of the change in the rotation speed of the engine 6 as brought about by the torque applied to the driving wheels 1a and 1b and hence to the engine. The torsion torque determined in this way can be made use of in the anti-lock brake control system according to the first embodiment, substantially to the same effect.

Embodiment 4

In the anti-lock brake control system according to the third embodiment of the invention, the rotation number ωe of the engine 6 is detected. However, in place of detecting the engine rotation speed, that of the drive shaft 33 shown in FIG. 2 may be detected. In particular, in the motor vehicle equipped with an automatic transmission, the driving wheels 1a and 1b are operatively coupled to the engine 6 through the medium of a torque converter. To say in another way, the driving wheels 1a and 1b are not directly connected to the engine 6, which in turn means that torque is scarcely transmitted from the driving wheels 1a and 1b to the engine 6. In that case, the rotation number (rpm) of the drive shaft 33 may be detected by a shaft rotation sensor 34 to thereby determine the torsion torque through the procedure described above in conjunction with the third embodiment of the invention, substantially to the same effect.

Embodiment 5

In the case of the anti-lock brake control systems according to the first and second embodiments of the invention, it has been assumed that the motor vehicle of concern is of a two-wheel driven type. It should however be mentioned that the anti-lock brake control system can equally be applied to a four-wheel driven type motor vehicle for controlling the brake application pressure. More specifically, a strain gauge may be provided in association with the axle shafts of the four wheels, respectively, wherein the processing similar to those described hereinbefore may be performed for each of the wheels, substantially to the same effect.

Furthermore, when the torsion of the drive shaft is to be detected in the structure in which the differential mechanisms are interposed between the engine 6 and the individual wheels as described hereinbefore in conjunction with the third embodiment, torque of a same magnitude acts on the two shafts disposed at the output side of the differential mechanism. Accordingly, the torque sensor may be provided at the shaft disposed at the input side of the differential mechanism to detect the torque appearing at the output of the engine. In other words, in the four-wheel driven motor vehicle, the output power of the engine 6 is divided into front and rear driving wheel systems, respectively, and again divided into left and right driving wheels in both the front and rear systems. In that case, the torque sensor may be interposed between the engine 6 and the differential mechanism for dividing the engine output power to the front and rear driving wheel systems for thereby determining the torsion torque applied to the four wheels.

Further, when the torsion torque is arithmetically determined by detecting the engine rotation number (rpm) as described hereinbefore in conjunction with the fourth embodiment in the four-wheel driven type motor vehicle equipped with the differential mechanisms for transmitting the engine torque to four driving wheels, the expression (8) mentioned hereinbefore can be used for determining the torsion torque while in the motor vehicle in which the differential mechanism is provided for dividing the engine output power into the front and rear driving wheel systems, the torsion torques of the front and rear wheels may be determined in accordance with the expression (7), substantially to the same effect as in the case of the first embodiment.

Further, the procedure for detecting the engine rotation number may be equally be applied for detecting the rotation speed (rpm) of the drive shaft 33.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, it is contemplated that storage or recording media on which the teachings of the invention are recorded in the form of programs executable by computers inclusive of microprocessor are to be covered by the invention.

Accordingly, all suitable modifications and equivalents may be resorted to, falling within the spirit and scope of the invention.

What is claimed is:

1. An anti-lock brake control system for a motor vehicle, having a plurality of wheels, for braking said motor vehicle safety while avoiding an occurrence of a wheel-locked state by repeatedly performing an operation for lowering a brake application pressure when a wheel speed decreases upon braking to a level at which said wheel-locked state is likely to occur and increasing again said brake application pressure when the wheel speed is recovered as a result of said lowering of the brake application pressure, comprising:

wheel speed detecting means for detecting a rotation speed of each of the wheels of said motor vehicle;

wheel acceleration arithmetic means for arithmetically determining acceleration of each wheel on the basis of the wheel speed obtained by said wheel speed detecting means;

torsion torque detecting means for detecting a torsion torque applied to a driving shaft for operatively connecting each of said wheels to driving means;

acceleration arithmetic correction means for arithmetically determining a corrected acceleration by correcting the wheel acceleration obtained from said wheel acceleration arithmetic means with the torsion torque obtained by said torsion torque detecting means;

control command means for issuing commands for controlling brake force to be applied to said wheel in dependence on values of both of said wheel acceleration and said corrected acceleration, respectively, and compensating for a delay in the detection of the torsion torque as compared to the detection of the wheel speed; and braking hydraulic pressure regulating means for controlling the brake application pressure in accordance with said commands.

2. An anti-lock brake control system according to claim 1, wherein said control command means issues to said braking hydraulic pressure regulating means a command for decreasing the brake application pressure when said wheel acceleration is smaller than a first predetermined value and when said corrected acceleration is smaller than a second predetermined value.

3. An anti-lock brake control system according to claim 1, wherein said control command means issues to said braking hydraulic pressure regulating means a command for increasing the brake application pressure when said wheel acceleration is not smaller than a first predetermined value and said corrected acceleration is not smaller than a second predetermined value.

4. An anti-lock brake control system according to claim 1, wherein said control command means issues to said braking hydraulic pressure regulating means a command for holding the brake application pressure when said wheel acceleration is smaller than a first predetermined value and when said corrected acceleration is not smaller than a second predetermined value.

5. An anti-lock brake control system according to claim 1, wherein said control command means issues to said braking hydraulic pressure regulating means a command for holding the brake application pressure when said wheel acceleration is not smaller than a first predetermined value and said corrected acceleration is less than a third predetermined value.

6. An anti-lock brake control system according to claim 1, wherein said control command means issues to said braking hydraulic pressure regulating means a command for increasing stepwise the brake application pressure when said wheel acceleration falls within a first predetermined range and when said corrected acceleration falls within a second predetermined range and when said wheel acceleration is decreasing.

7. An anti-lock brake control system according to claim 6, wherein said control command means issues to said braking hydraulic pressure regulating means a command for increasing stepwise the brake application pressure when said wheel acceleration falls within a range of values not smaller than a first predetermined value and smaller than a fourth predetermined value and when said corrected acceleration falls within a range of values not smaller than a third predetermined value and smaller than a second predetermined value and when said wheel acceleration is decreasing.

8. An anti-lock brake control system according to claim 1, wherein said control command means issues to said braking hydraulic pressure regulating means a command for holding the brake application pressure when said wheel acceleration is not smaller than a fourth predetermined value and when said corrected acceleration is not smaller than a third predetermined value and is smaller than a second predetermined value.

9. A method of controlling a brake force in an anti-lock brake control system for a motor vehicle, having a plurality of wheels for braking said motor vehicle safely while avoiding an occurrence of a wheel-locked state by repeatedly performing an operation for lowering a brake application pressure when a wheel speed decreases upon braking to a level at which said wheel-locked state is likely to occur and increasing again said brake application pressure when the wheel speed is recovered as a result of said lowering of the brake application pressure, comprising the steps of:

a) detecting a rotation speed of each of the wheels of said motor vehicle;

b) arithmetically determining acceleration of each wheel on the basis of the detected wheel speed;

c) detecting a torsion torque applied to a driving shaft operatively connecting each of said wheels to driving means;

d) arithmetically determining a corrected acceleration by correcting said wheel acceleration with said torsion torque;

e) issuing commands for controlling the brake force to be applied to said wheel in dependence on values of both of said wheel acceleration and said corrected acceleration, respectively, and which compensate for a delay in the detection of the torsion torque as compared to the detection of the wheel speed; and f) controlling the brake application pressure in accordance with said commands.

10. A brake force control method according to claim 9, wherein in said step e), a command for decreasing the brake application pressure is issued when said wheel acceleration is smaller than a first predetermined value and when said corrected acceleration is smaller than a second predetermined value.

11. A brake force control method according to claim 9, wherein in said step e), a command for increasing the brake application pressure is issued when said wheel acceleration is not smaller than a first predetermined value and said corrected acceleration is not smaller than a second predetermined value.

12. A brake force control method according to claim 9, wherein in said step e), a command for holding the brake application pressure is issued when said wheel acceleration is smaller than a first predetermined value and when said corrected acceleration is not smaller than a second predetermined value.

13. A brake force control method according to claim 9, wherein in said step e), a command for holding the brake application pressure is issued when said wheel acceleration is not smaller than a first predetermined value and said corrected acceleration is less than a third predetermined value.

14. A brake force control method according to claim 9, wherein in said step e), a command for increasing stepwise the brake application pressure is issued when said wheel acceleration falls within a range of values not smaller than a first predetermined value and smaller than a fourth predetermined value and when said corrected acceleration falls within a range of values not smaller than a third predetermined value and smaller than a second predetermined value and when said wheel acceleration is decreasing.

15. A brake force control method according to claim 9, wherein in said step e), a command for holding the brake application pressure is issued when said wheel acceleration is not smaller than a fourth predetermined value and when said corrected acceleration is not smaller than a third predetermined value and is smaller than a second predetermined value.

* * * * *